United States Patent Office 3,349,080
Patented Oct. 24, 1967

3,349,080
SOLUBLE EPOXY DERIVATIVES OF
CELLULOSE
Gordon D. Hiatt, Rochester, and Martin E. Rowley, Hilton, N.Y., assignors to Eastman Kodak Company, Rochester, N.Y., a corporation of New Jersey
No Drawing. Filed Feb. 13, 1967, Ser. No. 615,367
16 Claims. (Cl. 260—225)

ABSTRACT OF THE DISCLOSURE

Mixed cellulose esters that contain alkenoic acid radicals, at least some of which radicals are epoxidized, are soluble in acetone, but can be cured to insolubility in acetone to thereby yield an excellent protective coating.

This is a continuation-in-part of United States patent application Ser. No. 299,087, and now abandoned, filed July 31, 1963.

This invention relates to cellulose esters, the process for preparing the esters and to compositions containing those esters.

One object of our invention is to provide cellulose esters containing an epoxy group. Another object of our invention is to provide a process for preparing cellulose compositions containing epoxidized alkenoyl or epoxidized cycloalkenoyl groups. A further object of our invention is to provide compositions comprising cellulose esters which contain epoxy groups. Other objects of our invention will appear herein.

The cellulose compositions of our invention are those having chemically combined therewith a substituent selected from the group consisting of epoxidized alkenoyls and epoxidized cycloalkenoyls. We have found that these cellulose derivatives may be prepared conveniently by reacting an alkenoic or cycloalkenoic acid ester of cellulose with an acyl or aroyl hydroperoxide. We have also found that compositions containing epoxidized alkenoic or cycloalkenoic acid esters of cellulose may be cured to insolubility in acetone, although the starting derivatives are soluble in acetone.

Our invention will be further illustrated by the following examples.

Example 1

A mixture of 3 grams of dried sulfonated polystyrene resin containing about 8 percent divinyl benzene (ion-exchange resin) and 2 grams glacial acetic acid was allowed to stand for one-half hour at room temperature, and 30 grams of ethyl acetate and 15 grams of cellulose acetate crotonate were added to the mixture with stirring. The dope was placed in a 60° C. bath and 6 grams of 59 percent hydrogen peroxide were added slowly. The bath temperature was then raised to 75° C. and the mass was stirred continuously for 6 hours. The resulting dope was held at room temperature overnight, diluted with acetone and filtered through a sintered glass plate to remove the resin catalyst. The material was isolated by precipitation into distilled water, washed to remove acid and dried at room temperature overnight. The starting cellulose acetate crotonate contained 23.4 percent acetyl (1.8 acetyl groups per anhydroglucose unit) and 27.3 percent crotonyl (1.2 groups per anhydroglucose unit). The epoxidized cellulose acetate crotonate (which also could be named cellulose acetate 2,3-epoxy butyrate) product contained 0.04 gram equivalent epoxy oxygen per 100 grams of product.

Example 2

To 15 grams of a cellulose acetate tetrahydrophthalate was added 20 grams of ethyl acetate and 20 grams of acetic acid. After dissolving the ester at 50° C., 3 grams of acetic acid wet resin (sulfonated polystyrene containing 8 percent divinyl benzene, of which 50 percent of the weight was acetic acid) and 1.5 grams of 59 percent hydrogen peroxide were added with stirring. The solution was heated at 50° C. for two hours, diluted with acetone, and filtered to remove the resin catalyst. The product was precipitated into distilled water, washed with three changes of distilled water and dissolved in a 50:50 mixture of acetone and water. Sodium bicarbonate was added to neutralize the free phthalic acid group and the product reprecipitated into isopropanol, washed and dried at 50° C. The starting cellulose acetate tetrahydrophthalate had 20.5 percent acetyl (1.7 groups per anhydroglucose unit) and 32.7 percent tetrahydrophthalyl (0.7 group per anhydroglucose unit). The finished product contained 0.05 gram equivalent epoxy oxygen per 100 grams of ester. After drying at 50° C., the product was completely water soluble. Heating the dried material at 110° C. for 20 minutes partially insolubilized, and heating at 150° C. for 15 minutes made the product insoluble in water and dilute sodium hydroxide.

Example 3

To 15 grams of acetic acid and 75 grams of ethyl acetate were added 15 grams of a cellulose acetate tetrahydrophthalate. After dissolving the ester, 3 grams (50 percent being acetic acid) of sulfonated polystyrene containing 8 percent divinyl benzene was added and the flask transferred to a 50° C. bath. To the solution was added 1.5 grams of 59 percent hydrogen peroxide and the mixture stirred for 1 hour and 20 minutes at 50° C. The flask was then removed from the bath and allowed to stand at room temperature overnight. After dilution with acetone and filtering to remove the resin, the product was isolated by pouring into distilled water. The precipitate was washed free of acid and dried at 50° C. overnight. The cellulose acetate tetrahydrophthalate starting material contained 39.8 percent acetyl (2.8 groups per anhydro glucose unit) and 6.7 percent tetrahydrophthalyl (0.1 group per anhydroglucose unit). The epoxidized material became insoluble after 1½ hours heating at 150° C. The unepoxidized material after heating at 150° C. for 24 hours was still soluble.

Example 4

To 50 grams of acetic acid and 25 grams of ethyl acetate were added 15 grams of cellulose acetate 10-undecenate containing 20.8 percent acetyl (1.9 groups per anhydroglucose unit) and 37.6 percent 10-undecenyl (0.9 group per anhydroglucose unit). The flask was placed in an 80° C. bath and 3 grams of acetic acid wet resin (50 percent acetic acid, 50 percent sulfonated polystyrene containing 8 percent divinyl benzene) was added. With stirring, 3 grams of 59 percent hydrogen peroxide were added and the mixture was held at 80° C. for one hour. The solution was cooled, diluted with acetone and precipitated into distilled water. The product was dried at room temperature under vacuum. The epoxidized product contained 0.18 equivalent gram of epoxy oxygen per 100 grams product. Heating the dried flake material at 150° C. for 10 minutes rendered it insoluble in acetone.

Example 5

To 15 grams of cellulose acetate succinate tetrahydrophthalate containing 21.3 percent acetyl (1.75 groups per anhydroglucose unit) 27.3 percent succinyl (1.0 group per anhydroglucose unit) and 5.7% tetrahydrophthyl (0.1 group per anhydroglucose unit) were added 60 grams of 6.14 percent peracetic acid in acetic acid. Reaction was carried out at room temperature for 5 hours. The solution was diluted with acetone, precipitated into ethyl ether and washed with ether and air dried. The epoxidized product contained 0.007 gram equivalent epoxy oxygen per 100 grams material. Heating the flake material at 150° C. for 10 minutes insolubilized the product to acetone.

*Example 6*

To 8 grams of a cellulose butyrate oleate (25.3% oleoyl) was added 50 grams of 6.14 percent peracetic acid in peracetic acid. The solution was stirred at room temperature for 2 hours and at 40–50° C. for 1 hour. The solution was poured into distilled water to precipitate the product and was washed with distilled water until acid free. The material was dried at room temperature under vacuum overnight.

Analysis of the product showed 0.02 equivalent of epoxy oxygen/100 grams of ester.

*Example 7*

Fifteen grams of the cellulose acetate tetrahydrophthalate described in Example 2 was added to 75 grams of 6.14 percent peracetic acid in acetic acid and the reaction mixture stirred at room temperature for 2 hours. The solution was diluted with acetone, precipitated and washed in ethyl ether, and air dried. The product contained 0.073 gram equivalent epoxy oxygen per 100 grams of material.

*Example 8*

A methylcellulose tetrahydrophthalate (14.5% methoxy and 47.9% tetrahydrophthalyl) was epoxidized in a similar manner to that illustrated in Example 7. The material was readily insolubilized by heating at 150° C.

*Example 9*

A dope was prepared containing 10 grams of a commercial cellulose acetate butyrate, 3 grams of epoxidized cellulose acetate 10-undecenate (0.19 gram equivalent epoxy oxygen per 100 grams ester) and 50 grams of acetone. To the dope was added 0.6 gram of a mixture of mono- and di-butyl phosphate. The mixture was coated as a film onto a glass plate, cured and stripped from the plate surface. On curing, the film was insoluble in acetone.

*Example 10*

To 20 grams of ethyl acetate and 5 grams of acetic acid was added 15 grams of cellulose butyrate 10-undecenate containing 26 percent butyryl (1.8 groups per glucose unit) and 42 percent 10-undecenyl (1.2 groups per glucose unit). After the ester was dissolved, 3 grams acetic acid wet resin (sulfonated polystyrene containing 8 percent divinyl benzene) was added and the flask transferred to a 70° bath, and 4 grams of 59 percent hydrogen peroxide was added to the solution with stirring. After a reaction period of 4 hours, the contents of the flask were diluted with acetone and filtered to remove the resin catalyst. The product was isolated by precipitation into water, washed with a 1:1 water-methanol solution and dried at room temperature under vacuum. The epoxidized material contained 0.195 gram equivalent epoxy oxygen per 100 grams of ester. Adhesion was shown to be excellent for glass to glass and aluminum to aluminum bonds. The adhesion was accomplished by heating under pressure. After cooling, the bond was not broken by reheating due to cross-linking of the epoxidized material.

*Example 11*

Fifteen grams cellulose acetate crotonate was dissolved in 30 grams ethyl acetate and after dissolving, a solution of 15 grams meta-chloro perbenzoic acid and 30 grams ethyl acetate was added thereto. The mixture was reacted by refluxing for 3 hours, cooled, diluted with acetone, precipitated in ethyl alcohol and washed with alcohol. The product, after drying at 50° C., was found to contain 0.166 equivalent oxygen per 100 grams of product, which was a 50 percent conversion of the double bonds of the starting material to epoxy groups.

The cellulose compositions of our invention include the epoxidized alkenoic acid esters of cellulose wherein the alkenoyl substituent may be a straight or branched chain hydrocarbon group which may be substituted with groups or atoms such as carboxyl, hydroxyl, halogen and the like. The alkenoyl group may contain from 3 to 20 carbon atoms. Our invention also includes cycloalkenoyl substituted cellulose compositions wherein the cycloalkenoyl group contains an alicyclic ring of 4 to 6 carbon atoms, and which has an olefinic linkage between two adjacent carbon atoms in the ring. The cycloalkenoyl radical of the cellulose esters of the invention may contain substituents such as alkyl, carboxyl, hydroxyl, halogen and the like. The cellulose composition of the invention may also contain lower fatty acid radicals of 2–4 carbon atoms, or alkyl groups of 1 to 2 carbon atoms. Thus, the cellulose compositions of our invention also include acyl cellulose epoxidized alkenoic (or cycloalkenoic) acid esters, the acyl groups of which contain 2 to 4 carbon atoms, and alkyl cellulose epoxidized alkenoic (or cycloalkenoic) acid esters, the alkyl groups being methyl or ethyl.

The epoxidized cellulosic compositions of our invention are mixed esters of cellulose and generally contain from about 1 to about 2.8 saturated radicals (lower fatty acid and/or alkyl groups as described above), and preferably from about 1.5 to about 2.2 saturated groups, per anhydroglucose unit; and from about 0.05 to about 2 (and preferably from about 0.1 to about 1.5) "unsaturated" groups per anhydroglucose unit. (The term "unsaturated" herein is intended to encompass groups that were initially unsaturated, such as crotonate, undecenoate, tetrahydrophthalate, oleate, dodecene, and the like, some of which were subsequently converted to the corresponding epoxidized form).

The epoxy content of the epoxidized alkenoic and cycloalkenoic acid esters of cellulose of our invention may vary over a wide range. Generally, the materials of our invention contain from about 0.004 to about 0.4 (preferably from about 0.01 to about 0.2) equivalent of oxirane oxygen per 100 grams. In other words, from about 5 percent to about 90 percent of the "unsaturated" groups are epoxidized in the compounds of the present invention. Advantageously, at least 10% of the double bonds of the alkenyls or cycloalkenyl substituents of the cellulose esters of the invention are epoxidized.

The epoxidized alkenoic or cycloalkenoic acid esters of cellulose of our invention may be conveniently prepared in accordance with our invention by reacting alkenoic or cycloalkenoic acid esters of cellulose with an acyl hydroperoxide, such as peracetic acid. Any of the acyl or aroyl hydroperoxides may be satisfactorily employed to convert the double bond of the alkenoic or cycloalkenoic acid esters of cellulose to epoxy groups. The acyl hydroperoxides may be formed in situ in any suitable manner, for example by reacting hydrogen peroxide with the desired acid in the presence of an ion exchange resin such as sulfonated polystyrene. The concentration of acyl hydroperoxide is advantageously at least 10 percent, by weight, of the starting cellulose ester. Preferably, about 1 to 1.5 moles of acyl hydroperoxide are employed per each double bond of the starting material. The reaction may be conducted under a wide variety of conditions, and may be effected from room temperature up to and including reflux conditions.

The epoxidized alkenoic and cycloalkenoic acid esters of cellulose in accordance with our invention are highly useful materials since they may be dissolved after preparation in various solvents, such as acetone, and subsequently cured to an insoluble product. The curing of these products may take place at room temperature without the use of a catalyst, or, if desired, curing may be accelerated by employing elevated temperatures and/or a suitable catalyst. Such catalysts include, for example, alkyl phosphates such as butyl phosphate and aryl sulfonic acids such as p-toluene sulphonic acid.

Other hydroxyl containing polymers can be incorporated with the epoxidized alkenoic or cycloalkenoic acid esters of cellulose of the invention to produce compositions which may be coated or cast into a film or other useful shape from a solvent solution, and subsequently cured to insolubility. Typical hydroxyl containing polymers which may be incorporated with the epoxidized alkenoic and cycloalkenoic acid esters of cellulose include the lower fatty acid esters of cellulose such as cellulose acetate, cellulose propionate, cellulose butyrate, cellulose acetate propionate, and cellulose acetate butyrate. The cellulose esters and the epoxidized alkyl esters of cellulose may be incorporated in widely varying ratios, to produce compositions which may be cured to reduced solubility.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. An epoxidized alkenoic acid ester of cellulose containing
   (a) from about 1 to about 2.8 saturated groups per anhydroglucose unit; said saturated groups being selected from the group consisting of lower fatty acid groups containing from 2 to 4 carbon atoms and alkyl groups containing from 1 to 2 carbon atoms;
   (b) from about 0.05 to about 2 unsaturated groups per anhydroglucose unit; said unsaturated groups being selected from the group consisting of straight and branched chain alkenoic acids containing from 3 to 20 carbon atoms and cycloalkenoic acids containing from 4 to 6 carbon atoms in their rings; and
   (c) from about 0.004 to about 0.4 equivalent of oxirane oxygen per 100 grams.

2. An epoxidized alkenoic acid ester of cellulose as in claim 1, wherein said saturated groups are acetate groups and said unsaturated groups are crotonate groups.

3. An epoxidized alkenoic acid ester of cellulose as in claim 1, wherein said saturated groups are acetate groups and said unsaturated groups are undecenoate groups.

4. An epoxidized alkenoic acid ester of cellulose as in claim 1, wherein said saturated groups are butyrate groups and said unsaturated groups are undecenoate groups.

5. An epoxidized alkenoic acid ester of cellulose as in claim 1, wherein said saturated groups are acetate groups and said unsaturated groups are tetrahydrophthalate groups.

6. An epoxidized alkenoic acid ester of cellulose as in claim 1, wherein said saturated groups are succinate groups and said unsaturated groups are tetrahydrophthalate groups.

7. An epoxidized alkenoic acid ester of cellulose as in claim 1, wherein said saturated groups are butyrate groups and said unsaturated groups are oleate groups.

8. An epoxidized alkenoic acid ester of cellulose as in claim 1, wherein said saturated groups are methyl groups and said unsaturated groups are tetrahydrophthalate groups.

9. An epoxidized alkenoic acid ester of cellulose as in claim 1, wherein the number of said saturated groups per anhydroglucose unit is from about 1.5 and about 2.2; the number of said unsaturated groups per anhydroglucose unit is from about 0.1 to about 1.5; and at least about 10% of the double bonds of said unsaturated groups are epoxidized.

10. An epoxidized alkenoic acid ester of cellulose as in claim 9, wherein said saturated groups are acetate groups and said unsaturated groups are crotonate groups.

11. An epoxidized alkenoic acid ester of cellulose as in claim 9, wherein said saturated groups are acetate groups and said unsaturated groups are undecenoate groups.

12. An epoxidized alkenoic acid ester of cellulose as in claim 9, wherein said saturated groups are butyrate groups and said unsaturated groups are undecenoate groups.

13. An epoxidized alkenoic acid ester of cellulose as in claim 9, wherein said saturated groups are acetate groups and said unsaturated groups are tetrahydrophthalate groups.

14. An epoxidized alkenoic acid ester of cellulose as in claim 9, wherein said saturated groups are succinate groups and said unsaturated groups are tetrahydrophthalate groups.

15. An epoxidized alkenoic acid ester of cellulose as in claim 9, wherein said saturated groups are butyrate groups and said unsaturated groups are oleate groups.

16. An epoxidized alkenoic acid ester of cellulose as in claim 9, wherein said saturated groups are methyl groups and said unsaturated groups are tetrahydrophthalate groups.

References Cited

UNITED STATES PATENTS

| | | | |
|---|---|---|---|
| 2,455,083 | 11/1948 | Musser | 260—231 |
| 2,891,059 | 6/1959 | Wagner | 260—231 |
| 3,063,982 | 11/1962 | Peras | 260—231 |
| 3,194,627 | 7/1965 | Gagarine | 8—116 |

FOREIGN PATENTS

| | | |
|---|---|---|
| 494,336 | 7/1952 | Canada. |
| 517,787 | 10/1965 | Canada. |

DONALD E. CZAJA, *Primary Examiner.*

R. W. MULCAHY, *Assistant Examiner.*